United States Patent [19]

King

[11] Patent Number: 4,954,601

[45] Date of Patent: Sep. 4, 1990

[54] POLYIMIDE PRECURSORS AND METHOD FOR PREPARING CROSSLINKED POLYIMIDES USING SAID PRECURSORS

[75] Inventor: Russell K. King, Beaver, Mich.

[73] Assignee: Dow Corning Corporation, Midland, Mich.

[21] Appl. No.: 293,153

[22] Filed: Jan. 3, 1989

[51] Int. Cl.$^5$ .................... C08G 18/80; C08G 73/06; C08G 73/10

[52] U.S. Cl. ..................................................... 528/45

[58] Field of Search ........................................ 528/45

[56] References Cited

U.S. PATENT DOCUMENTS

| | | | |
|---|---|---|---|
| 3,847,867 | 11/1974 | Heath et al. | 528/26 |
| 3,857,820 | 12/1974 | Kojima et al. | 528/45 |
| 3,896,089 | 7/1975 | Noda et al. | 528/45 |
| 3,997,513 | 12/1976 | Noda et al. | 528/45 |
| 4,313,999 | 2/1982 | Hughes | 428/251 |
| 4,322,332 | 3/1982 | Hughes | 525/424 |
| 4,429,073 | 1/1984 | Pauze et al. | 524/600 |
| 4,742,153 | 5/1988 | Sutton, Jr. | 528/125 |

*Primary Examiner*—Maurice J. Welsh
*Assistant Examiner*—Rabon Sergent
*Attorney, Agent, or Firm*—Robert Spector

[57] ABSTRACT

Curable precursors yielding crosslinked, thermally stable polyimides upon heating comprise (1) at least one anhydride-terminated polyamic acid oligomer obtained by reacting an aromatic tetracarboxylic acid dianhydride with an aromatic diamine and (2) a blocked polyfunctional organic isocyanate that reacts to liberate the free isocyanate at a temperature above the imidization temperature of said oligomer. The molar concentration of isocyanate groups in said composition is substantially equal to the molar concentration of terminal anhydride groups in the oligomer.

8 Claims, No Drawings

POLYIMIDE PRECURSORS AND METHOD FOR PREPARING CROSSLINKED POLYIMIDES USING SAID PRECURSORS

FIELD OF THE INVENTION

This invention pertains to polyimides. More particularly, this invention pertains to improved aromatic polyimide precursors that can be fabricated using conventional techniques and cured by reaction with a blocked isocyanate that is part of the precursor. The cured polyimides do not melt or flow below their decomposition temperatures, which are typically above 300° C.

DESCRIPTION OF THE PRIOR ART

Polyimides prepared by the reaction of at least one dianhydride of a tetracarboxylic acid with a diamine are known materials. These polymers are discussed in volume 12 of the Encyclopedia of Polymer Science and Technology, published in 1964 by John Wiley and Sons, beginning at page 364.

Polyimides derived from aromatic tetracarboxylic acid dianhydrides and aromatic diamines are particularly desirable because of their chemical inertness and thermo-oxidative stability at temperature of 300° C. and above.

One type of aromatic polyimide includes condensation type polymers prepared by reacting substantially equimolar amounts of an aromatic tetracarboxylic acid dianhydride and an aromatic diamine. The product of this reaction is a polyamic acid characterized by the general formula

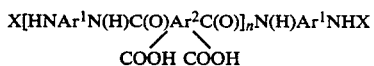

One of the two unreacted carboxy groups shown in formula I is located on a carbon atom adjacent to the carbon atom bearing one of the two amido —C(O)N(H) groups, and the second carboxy group is located on a carbon atom adjacent to the carbon atom bearing the second of two amido groups. $Ar^1$ represents a divalent aromatic hydrocarbon radical wherein the nitrogen atom of the two amido groups are bonded to aromatic carbon atoms and $Ar^2$ represents a tetravalent aromatic hydrocarbon radical wherein the carbon atoms of all the amido and carboxy groups are bonded to aromatic carbon atoms. X represents the terminal groups of the polymer molecule and n represents the degree of polymerization of the polyamic acid, which is typically from about 50 to about 400.

The polyamic acid is converted to the corresponding polyimide by heating it at temperatures of from 150° to 300° C. Catalysts such as organotin compounds can be used to accelerate the imidization reaction.

Polyimides derived from reactants containing only one aromatic ring per monomer molecule are typically intractable materials that do not melt or flow below their composition temperature. Any fabrication of these polymers must be performed using the polyamic acid precursors of the polyimide, which are represented by formula I.

The majority of condensation type polyimides derived from tetracarboxylic acd dianhydrides and/or diamines containing at least two aromatic hydrocarbon radicals per molecule that are linked by alkylene radicals, by a sequence of diorganosiloxane units or by atoms such as oxygen and sulfur, are melt processable in the imide form. The shortcoming of these polymers is that their glass transition temperatures are tyically below about 250° C. While these polyimides may be stable at temperatures up to about 350° C. and above, their physical properties, particularly modulus and compressive strength, decrease significantly above their glass transition temperature. Some of these polyimides, particularly those derived from dianhydrides containing three or more phenyl radicals inked by oxygen atoms, are thermoplastic materials at temperatures above about 190° C.

One method for reducing the loss in physical properties and eliminating the thermoplastic flow exhibited by some condensation type polyimides at temperatures below about 300° C. is to crosslink the polymer during conversion frm the polyamic acid to the imide form. The crosslinking agents are relatively small molecules containing at least 2 functional groups that will react with the carboxy and/or amine groups present in the polyamic acid.

U.S. Pat. No. 4,322,332, which issued to R. Hughes on Mar. 30, 1982 describes coating compositions comprising a reaction product of a bis(ether dianhydride) such as 2,2-bis[4(3,3-dicarboxyphenoxy)phenyl]-propane dianhydride and a diamine such as m-phenylenediamine. The resultant polyamic acid is crosslinked by reacting with a trifunctional isocyanate. This composition is applied to a substrate as a solution comprising the polyamic acid, a blocked form of the trifunctional isocyanate and a suitable solvent. The resultant coated substrate is then heated to evaporate the solvent and unblock the isocyanate groups, which then react to crosslink the polymer.

The use of isocayanate-crosslinked polyimides of the type described in the afornentioned Hughes patent as a binder for laminates formed from plies of fabric is taught in U.S. Pat. No. 4,313,999, which issued to R. Hughes on Feb. 2, 1982.

Because of the large amount of volatile materials, particularly solvents, the compositions described in the aforementioned Hughes patents may not be useful as molding compositions under certain conditions. Volatization of these liquid materials during the molding operation could result in considerable void formation in the molded article.

A second type of polyimide, referred to as an addition type polymer, is prepared by reacting a diamine with a mixture of an aromatic tetracarboxylic acid dianhydride (such as pyromellitic dianhydride) and an aliphatic dianhydride (such as nadic anhydride) containing at least one ethylenically unsaturated hydrocarbon radical in the molecule. After the resultant polyamic acid has been fabricated it is converted to the imide form and then cured by a free radical mechanism to yield a crosslinked polymer. The disadvantage of these polyimides is the presence of aliphatic carbon atoms, which substantially lower the heat stability of the polymers.

An objective of this invention is to provide improved curable compositions that can be molded or otherwise fabricated using conventional fabrication techniques and subsequently crosslinked to yield polyimides exhibiting excellent thermooxidative stability and rheological properties, particularly storage and loss modulus, at temperatures above 300° C. Storage modulus is a measure of the stiffness of the polymer. The loss modulus indicates the glass transition temperatures of the polymer and is a measure of the ability of the polymer to convert mechanical energy to heat.

A second objective of this invention is to provide a method of preparing crosslinked polyimides using these improved curable compositions.

SUMMARY OF THE INVENTION

The curable compositions of this invention comprise (1) at least one anhydride-terminated polyamic acid oligomer obtained by reacting an aromatic tetracarboxylic acid dianhydride with an aromatic diamine and (2) a blocked polyfunctional organic isocyanate that reacts to liberate the free isocyanate at a temperature above the imidization temperature of said oligomer. The molar concentration of isocyanate groups in said composition is substantialy equal to the molar concentration of terminal anhydride groups in the oligomer.

DETAILED DESCRIPTION OF THE INVENTION

This invention provides an improved heat curable polyimide precursor comprising

A. a polyamic acid prepared by reacting at least one aromatic diamine with at least one aromatic tetracarboxylic acid dianhydride, and B. a blocked polyfunctional isocayante in an amount sufficient to cure said precursor. where the improvement comprises (1) the presence of said polyamic acid as an oligomer containing an average of from 2 to 30 repeating units per molecule and terminal groups of the formula —C(O)OC(O)—, where the free valences of said groups are bonded to adjacent carbon atoms of an aromatic ring structure, (2) a molar ratio of blocked isocyanate to said terminal groups of 1:1, and (3) a decomposition temperature of said blocked isocyanate that is above the lowest temperature at which said oligomer will convert to a polyimide.

This invention also provides an improved method for preparing a crosslinked polyimide, said method comprising the following steps:

A. forming an anhydride-terminated polyamic acid oligomer containing an average of from 2 to 30 repeating units per molecule by reacting an aromatic diamine with a stoichiometric excess of an aromatic tetracarboxylic acid dianhydride.

B. blending said oligomer with an equimolar quantity of a blocked polyfunctional isocyanate, based on the number of moles of terminal anhydride groups present in said oligomer, where the temperature at which said blocked isocyanate reacts to form free isocyanate groups is higher than the temperature used to convert said oligomer to a polyimide, C. heating the mixture of oligomer and blocked isocyanate to a temperature sufficient to convert the amic acid groups of said oligomer to imide groups without reacting said blocked isocyanate, thereby maintaining the polyimide in a thermoplastic state, and finally D. increasing the temperature of said mixture to initiate the reaction of said blocked isocyanate with the terminal anhydride groups of said oligomer to form a thermoset polyimide.

The characterizing features that distinguish the present curable polyimide precursors from prior art polyimide compositions are the presence of (1) anhydride-terminated polyamic acid oligomers containing an average of from 2 to 30 repeating units per molecule, (2) a blocked isocyanate wherein the temperature at which the blocked isocyanate decomposes to free isocyanate groups is above the temperature at which the amic acid groups of said oligomer are converted to imide groups, and (3) equimolar amounts of blocked isocyanate and anhydride terminal groups present in the oligomer. The lowest temperature at which the mixture of imide oligmer and blocked isocyanate will flow is lower than the flow temperature of many prior art polyimide precursors. The Polyamic Acid Oligomers The polyamic acid oligomers that constitute one of the two reactive ingredients of the present curable compositions are prepared by reacting an aromatic diamine with a stoichiometric excess of an aromatic tetracarboxylic acid dianhydride.

The aromatic diamine can be represented by the formula

where $Ar^1$ represents an divalent aromatic hydrocarbon radical. Aromatic hydrocarbon radicals contain at least one carbocyclic aromatic ring structure, such as phenylene. If more than one such aromatic ring is present, these can be fused or a series of two or more single rings can be joined by a carbon-to carbon bond, or by a linking group such as alkylene or carbonyl.

Preferred diamines include but are not limited to the isomeric phenylene diamines, 4,4'-diaminobenzophenone, bis(4-amino)diphenyl ether and 2,2-bis(4-aminophenyl)propane.

The diamine is reacted with an aromatic tetracarboxylic acid dianhydride that can be represented by the general formula III.

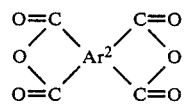

where the $Ar^2$ represents a tetravalent aromatic hydrocarbon radical and the carbon atoms of each of the two anhydride groups are bonded to adjacent carbon atoms of an aromatic ring structure. The two anhydride groups can be bonded to the same aromatic ring structure, as is true for pyromellitic dianhydride. Alternatively, the two anhydride groups are bonded to different aromatic ring structures that are fused or linked together as described hereinbefore for $Ar^1$.

Preferred dianhydrides include but are not limited to 3,3', 4,4'-benzophenone tetracarboxylic acid dianhydride and 2,2-bis(3,4-dicarboxyphenyl)propane dianhydride.

Particularly preferred polyamic acid oligomers are derived from the reaction of benzophenone tetracarboxylic acid anhydride with 3,3'-diaminobenzophenone.

The molar ratio of dianhydride to diamine is typically from 2:1 to 41:40, a range of from 1.5:1 to 11:10 being preferred. Below a molar ratio of 21:20 the average number of repeating units in the oligomeric polyamic acid exceeds about 30, making it difficult to process without adding an excessive amount of solvent to the composition. Increasing the number of repeating units increases the distance between the terminal anhydride groups of the oligomer, the only locations at which crosslinking by the polyfunctional isocyanate is believed to occur. If the distance between crosslinks is too high, this will adversely affect the physical properties of the cured polyimide.

The oligomeric polyamic acids of this invention can be represeted by the general formula

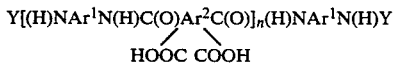

where one of the two unreacted carboxy (—COOH) groups of said formula is located on a carbon atom adjacent to the carbon atom bearing one of the two amido, —C(O)N(H), groups and the second unreacted carboxy groups is located on a carbon atom adjacent to the carbon atom bearing the second of two amido groups, $Ar^1$ and $Ar^2$ are as previously defined. Y represents the terminal anhydride groups of said polyamic acid, and n represents the average degree of polymerization of said polyamic acid oligomer, which is between 2 and 30.

If $Ar^1$ and $Ar^2$ contain substituents other than the amine and anhydride groups that react to form the polymeric acid, these substituents can be one or more halogen atoms or other groups that will not interfere with formation or curing of the oligomeric polyamic acid.

In many instances a mixture of the diamine and tetracarboxylic acid dianhydride will react at ambient temperature to form the corresponding oligomeric polyamic acid.

In acordance with the present method oligomeric polyamic acids are prepared by combining at least one each of the aromatic diamines and tetracarboxylic acid dianhydrides discussed hereinbefore. The reaction is preferably conducted in the presence of an organic liquid that is a solvent for both of the reactants and the blocked polyfunctional isocyanate used as a latent crosslinking agent. Useful organic liquids include but are not limited to amides such as N,N-dimethylformamide and N,N-dimethylacetamide, dimethylsulfoxide and etherified glycols such as the dimethyl ether or ethylene glycol. The concentration of the reactants in the solution is typically from about 20 to about 60 weight percent.

The reaction between many tetracarboxylic acid anhydrides and diamines will occur at room temperature. In some instances it may be desireable to heat the reaction mixture to accelerate oligomer formation.

The Polyfunctional Blocked Isocyanate

Following imidization of the polyamic acid oligomers of this invention, the oligomers are cured by reacting them with a blocked isocyanate containing an average of more than 2 isocyanate groups per molecule. The terms "blocked" implies that the isocyanate groups have been reacted with a monofunctional compound to form a product that is stable at room temperature but decomposes at temperatures above about 150° C. to yield the free isocyanate group. These compounds are well known as latent curing agents for polyurethanes.

Known polyfunctional isocyanates include the cyclic trimer of 2,4-tolylene diisocyanate, triphenylmethane triisocyanate, and polymeric isocyanate compounds obtained by reacting diissocyanates with polyfunctional alcohols such as trimethylolpropane. Oligomeric isocyanates corresponding to the formula

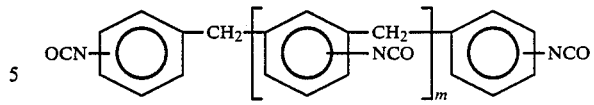

where the value of m is greater than 2 up to about 3 are particularly preferred because they are also believed to function as plasticizers for the polymeric acid oligomer, thereby allowing the composition flow at temperatures below that at which the free isocyanate group is generated, resulting in curing of the composition.

The blocking agent for the polyfunctional isocyanate can be an alcohol, phenol, mercaptan or any of the other compounds known to react to form metastable compounds with isocyanate groups. The only requirement for the blocking reactant is that the resultant blocked isocyanate compound decompose to liberate the isocyanate at a temperature above the minimum temperature at which the polyamic groups present on the oligomer react to form imide groups. This temperature can be readily determined by infra-red spectroscopy, noting the temperature at which the absorption maxima at $1740 \text{ cm}^{-1}$ and $2200$–$3600 \text{ cm}^{-1}$, characteristic of the amic acid and free carboxyl groups, respectively, disappear. For the preferred oligomeric polyamic acids of this invention this temperature is between about 150° and 220° C. Blocking groups which are stable at this temperature include the aliphatic alcohols, particularly ethanol, n-propanol, iso-propanol and methanol.

The number of blocked isocyanate groups present in the curable compositions is substantially equal to the number of acid anhydride terminal groups on the oligomeric polyamic acid. This will ensure that crosslinking occurs only at the terminal positions of the polymeric acid oligomer.

Many of the polyimide precursors of this invention are solid materials at ambient temperature. If it is desired to process these precursors as liquids they can be dissolved in the same types of organic liquids used to prepare them. The precursors can be compression molded in the absence of solvents.

An unique advantage of the present precursors is their ability to flow in the imidized form prior to being crosslinked by reacting with the free isocyanate groups formed following decomposition of the blocked isocyanate used as the crosslinking agent. The crosslinked polymers are classified as thermoset materials and will not flow or soften to any significant extent below their decomposition temperatures.

The tensile properties and thermal stability of the crosslinked polyimides prepared using the precursors of this invention make them desirable for use in preparing articles that maintain a high level of tensile properties at temperatures of 300 degrees C. and above. These polyimides are particularly preferred for use in composites wherein the polymer acts as the binder for glass or ceramic fibers. The resultant composites exhibit the strength of metals such as steel and aluminum at a fraction of the weight.

The following examples are intended to describe preferred embodiment of the present invention and should not be interpreted as limiting the scope of the invention as defined in the accompanying claims. Unless otherwise specified all parts and percentages in the examples are by weight and viscosities were measured at 25 degrees C.

EXAMPLE 1

Crosslinked polyimides of the present invention were prepared using the amounts of reactants indicated in the following Table 1.

Preparation of the Polyamic Acid

A glass reactor equipped with a mechanically driven stirrer, a water cooled condenser and a nitrogen inlet was charged with 3,3-diaminobenzophenone (the diamine) and dry N,N-dimethylacetamide (DMAc) as the solvent. When the diamine dissolved the amount of 3,3',4,4'-benzophenone tetracarboxylic acid dianhydride (BTDA) was added in portions as the reaction mixture was stirred. Stirring was continued for one hour at which time a blocked trifunctional isocyanate, 1,3,5-tris(N-4-phenoxyethyl carbamate, was added to the reaction mixture as the crosslinker and stirring was continued for an additional hour.

The amounts of anhydride, diamine, crosslinker and solvent used to prepare the polyamic acids are summarized in Table 1. The amounts of reactants are expressed in terms of both grams and millimoles

TABLE 1

| Sample | Diamine g(mmol) | Dianhydride g(mmol) | Crosslinker g(mmol) | DMAc cc |
|---|---|---|---|---|
| 1 | 1.245(5.84) | 3.76(11.67) | 1.48(2.40) | 17 |
| 2 | 1.65(7.79) | 3.35(10.39) | 1.07(1.73) | 14 |
| 3 | 1.77(8.35) | 3.23(10.02) | 0.69(1.13) | 14 |

Sample 1 contained an average of 8 repeating polyamic units per molecule, calculated based on the molar excess of dianhydride. On the same basis sample 2 contained an average of 18 units per molecule and sample 3 contained an average of 28 repeating units per molecule. The infrared absorption spectra of the oligomers indicated that all contained anhydride terminal units.

The polyamic solutions were evaporated to dryness at a temperature of 110° C. for between 3 to 8 days. The resultant yellow solid, a polyamic acid containing the blocked isocyanate, was ground to a fine powder using a mortar and pestle. Each of the three powders were compression molded and cured using a die consisting of a 1.5 mm.-thick stainless steel plate with a rectangular die cavity measuring 5.1×2.5 cm. A 0.05 mm-thick sheet of polyimide filled with silica and alumina (available from Richfield Chemical Co.) was glued onto the lower surface of the stainless steel plate using a commercially available silicone elastomer composition (Sylgard(®) 184 from the Dow Corning Corporation) as the adhesive. Two grams of one of the three finely ground polyamic acid/blocked isocyanate mixtures was spread into the die cavity. This layer was then covered with a 0.007 mm-thick layer of a Teflon(®) coated fiberglass scrim cloth measuring 5.12×2.5 cm. followed by a second layer of the aforementioned filled polyimide. A plunger having the same dimensions as the die cavity was cut from a 0.82 mm-thick sheet of a titanium alloy available as Ti-6-Al-4V and positioned so as to fit into the die cavity in the steel plate.

The following heating cycle was used to cure the samples:

1. The steel plates containing the filled die cavities were placed in a hydraulic press that had been preheated to 210° C.
2. Using an initial pressure of 200 psig (1.38 MPa) the temperature of the press platens was gradually increased to 300° C. over a 9 minute interval. The pressure was allowed to decrease as the composition flowed within the die.
3. When the pressure stabilized it was increased to 200 psig and the temperature was increased from 300° to 350° C., both over a 5 minute interval.
4. The temperature was maintained at 350° C. for 40 minutes, then increased to 370° C. and maintained for 30 minutes.
5. Heating was discontinued. When the temperature of the platens decreased to 200°-270° C. the steel plates were removed from the press.
6. The samples were allowed to post-cure for 24 hours in an oven maintained at a temperature of 370° C.

The density and thickness of the three polyimide samples are listed in Table 2.

TABLE 2

| Sample | Density g/cc | Thickness mm |
|---|---|---|
| 1 | 1.31 | 0.77 |
| 2 | 1.29 | 0.89 |
| 3 | 1.11 | 0.42 |

EXAMPLE 2

This example demonstrates the preparation of one type of prior art type of polyimide.

For purposes of comparison a polyamic acid was prepared using equimolar amounts of the same diamine and tetracarboxylic acid dianhydride described in the preceding example. Polyamic acids of this type are the traditional intermediates for preparing high molecular weight polyimides. In this instance no blocked isocyanate was present in the reaction mixture.

A 30 weight percent polyamic acid solution was prepared by gradually adding 21.10 g. (65.5 mmol) of the dianhydride to a solution of the diamine (13.9 g, 65.5 mmol) in 75 cc of N,N-dimethylacetamide. The resultant mixture was stirred at room temperature for 45 minutes, stored at room temperature for 3 hours and then refrigerated until it was desired to cure the polymer, at which time it was poured into a mold formed by securing 4 glass microscope slides to a sheet of aluminum foil to form a rectangular cavity measuring 13×10 cm. The solvent was then evaporated by heating the mold for nine days in a vacuum oven maintained at 60° C. Nitrogen was circulated through the oven during this period. The resultant transparent slab measured between 1.2 and 1.6 mm. in thickness. Samples measuring 5×5 cm. were cut from this slab and cured in accordance with the following procedure.

A plate of stainless steel measuring 15 by 15 cm. was covered with a sheet of cured polyimide available as Kapton(®) supplied by E.I. DuPont de Nemours and Co., followed, in sequence, by a layer of Teflon(®) coated fiberglass scrim cloth of the same type described in Example 1, the polyamic acid sample prepared as described in the first part of the present example, a second layer of Teflon-coated fiberglass, a second layer of Kapton film and a second steel plate. Four spacers measuring 1.2 mm. in thickness were placed around the polyamic acid sample to control the final thickness of the cured sample. The final laminate was placed on the lower platen of a hydraulic press. The initial temperature of the platen was 50° C. The temperature of the platen and the pressure were varied in accordance with the cycle shown in Table 3 to produce a cured sample.

TABLE 3

| TIME (MIN) | TEMP (°C.) | PRESS.(PSI) | TIME (MIN) | TEMP (°C.) | PRESS.(PSI) |
|---|---|---|---|---|---|
| 0.0 | 50 | 0 | 58.0 | 250 | 155 |
| 2.0 | 70 | 30 | 59.0 | 250 | 155 |
| 5.0 | 120 | 30 | 61.0 | 275 | 140 |
| 7.0 | 165 | 25 | 68.0 | 275 | 126 |
| 8.0 | 165 | 80 | 92.0 | 275 | 120 |
| 9.0 | 170 | 68 | 95.0 | 300 | 95 |
| 9.5 | 175 | 130 | 100.0 | 300 | 80 |
| 10.0 | 185 | 125 | 101.0 | 300 | 180 |
| 10.1 | 200 | 130 | 107.0 | 300 | 163 |
| 12.0 | 205 | 110 | 125.0 | 300 | 155 |
| 22.0 | 200 | 95 | 126.0 | 300 | 180 |
| 24.0 | 225 | 98 | 143.0 | 300 | 173 |
| 25.0 | 225 | 130 | 148.0 | 325 | 173 |
| 27.0 | 230 | 123 | 160.0 | 325 | 173 |
| 30.0 | 230 | 119 | 161.0 | 325 | 205 |
| 38.0 | 230 | 115 | 162.0 | 325 | 203 |
| 40.0 | 250 | 111 | 168.0 | 350 | 210 |
| 40.1 | 250 | 180 | 210.0 | 350 | 205 |
| 46.0 | 250 | 165 | 245.0 | 245 | 144 |
| 50.0 | 250 | 160 | 267.0 | 195 | 130 |

The density of the sample was 1.35 g./cc. and the thickness was 1.0 mm. Samples were cut from the cured samples using a diamond-tipped saw to determine the weight lost during prolonged heating. The samples were then sanded to a thickness of 0.82±0.002 mm.

EXAMPLE 3

This example compares the storage and loss modulus of the present polyimides and prior art polyimides at temperatures from ambient to above 300° C.

The storage and loss modulus of the three cured polyimide samples described in example 1 and the prior art polyimide of example 2 were measured using a Rheometrics Spectrometer operating at a frequency of 1 Hz. The temperature of the samples was gradually increased from ambient to 370° C. while the storage modulus and loss modulus were measured at 25° C. intervals.

The loss modulus for a given polymer typically remains relatively constant with increasing temperature for a time, then increases relatively rapidly to a maximum at the glass transition temperature ($T_g$) of the polymer and then decreases at about the same rate as the temperature is increased above this value. The loss modulus data demonstrate that the $T_g$ of sample 3 is about 290° C. (loss modulus=$8\times10^8$ dynes/cm$^2$) and the $T_g$ for the prior art polyimide example 2 is 40 degrees lower (250° C., loss modulus=$1\times10^9$ dynes/cm$^2$). The $T_g$ of samples 2 and 3 is above 370° C., the maximum temperature at which the samples were evaluated.

The higher glass transition temperatures of the present polyimides are reflected in their higher storage modulus values relative to the prior art polyimide of Example 2. The storage modulus of sample 3 began to decrease rapidly from a value of $7\times10^9$ dynes/cm$^2$ at 275° C. to a value of $3\times10^8$ at 348° C. The storage modulus of the prior art polyimide of example 2 began to decrease rapidly from a value of $8\times10^9$ dynes/cm$^2$ at 227° C. to a value of $1.6\times10^7$ dynes/cm$^2$ at 287° C. This decrease in storage modulus occurred over a considerably lower temperature range than the decrease for sample 3 of Example 1.

The storage modulus value for sample 1 varied from $1.4\times10^{10}$ dynes/cm$^2$ at 30° C. to $5.7\times10^9$ dynes/cm$^2$ at 359° C., the highest temperature at which this measurement was performed. The storage modulus value for sample 2 varied from $9.6\times10^9$ dynes/cm$^2$ at 30° C. to $2.9\times10^9$ dynes/cm$^2$ at 360° C., the highest temperature at which this measurement was performed.

EXAMPLE 4

This example describes the preparation of a prior art type of crosslinked polyimide.

A suspension of 26.01 g (80.72 mmol) of BTDA, identified in example 1, and 12.68 g (77.24 mmol) of nadic anhydride in 54.78 g of methanol was slowly heated to reflux temperature for 1 hour and stirred for about 16 hours at room temperature. To this reaction mixture was added 23.66 g (11.93 mmol) of 4,4'-methylenedianiline. The resultant solution was concentrated by heating to 60°-65° C. under reduced pressure to yield 77.6 g. of a resinous material. This material was cooled and ground to a fine powder using a mortar and pestle.

Imidization of the resultant polyamic acid was accomplished by heating the powder for one hour at 180° C. followed by 1 hour at 200° C. The yield was 57.51 g. The partially consolidated mass was again ground into a fine powder.

Samples were molded from this powder using the procedure described in the preceding Example 1 to obtain sample 4. The procedure described in this example was repeated to obtain a second polyimide sample, referred to as sample 5.

EXAMPLE 5

This example compares the long-term thermal stability of the polyimide samples of Example 1 with the stability of the prior art polyimide described in Example 4.

Thermal stability was determined by placing the samples in a circulating air oven maintained at a temperature of 371° C. The samples were removed from the oven at the time intervals specified as H in the following table, cooled to room temperature and weighed. The intervals are based on the time the sample was first put in the oven. The two polyimide samples (4 and 5) prepared as described in Example 4 are identified as control samples.

| | Percent Weight Remaining at Time H (Hours) | | |
|---|---|---|---|
| | H = | | |
| SAMPLE | 92.3 | 116.15 | 141.8 |
| 1 | 79.9 | 70.4 | 55.2 |
| 2 | 81.7 | 75.7 | 68.8 |
| 3 | 87.0 | 80.4 | 73.9 |
| 4 (Prior Art) | 56.8 | 42.8 | 31.0 |
| 5 (Prior Art) | 75.5 | 66.2 | 57.5 |

That which is claimed is:

1. In a heat curable polyimide precursor comprising
A. a polyamic acid prepared by reacting at least one aromatic diamine represented by the formula $$H_2NAr^1NH_2$$

with at least one aromatic tetracarboxylic acid dianhydride, represented by the formula

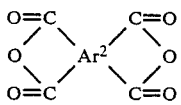

where $Ar^1$ represents a divalent aromatic hydrocarbon radical, $Ar^2$ represents a tetravalent aromatic hydrocarbon radical, and the carbon atoms of each of the two anhydride groups are bonded to adjacent carbon atoms of an aromatic ring structure, and B. a blocked polyfunctional isocyanate in an amount sufficient to cure said precursor, the improvement comprising (1) the presence of said polyamic acid as an oligomer containing an average of from 2 to 30 repeating units per molecule, no $\equiv$C—O—C$\equiv$ groups in $Ar^1$ or $Ar^2$ and terminal groups of the formula —C(O)OC(O)—, where the free valences of said terminal groups are bonded to adjacent carbon atoms of an aromatic ring structure. (2) a molar ratio of blocked isocyanate to said terminal groups, of 1:1, and (3) a decomposition temperature of said blocked isocyanate that is above the lowest temperature at which said oligomer will convert to a thermoplastic polyimide.

2. A polyimide precursor according to claim 1 where the molar ratio of dianhydride to diamine is from 2:1 to 41:40.

3. A polyimide precursor according to claim 2 where the aromatic hydrocarbon radicals represented by $Ar^1$ and $Ar^2$ contain at least one carbocyclic aromatic ring structure or a plurality of said ring structures that are fused or form a series of two or more single rings that are joined directly by a carbon-to-carbon bond, or through an alkylene or carbonyl group.

4. A polyimide precursor according to claim 3 where said aromatic diamine is selected from the group consisting of the isomeric phenylene diamines, 4,4'-diaminobenzophenone, and 2,2-bis(4-aminophenyl)propane, the tetracarboxylic acid dianhydride is selected from the group consisting of 3,3',4,4'-benzophenone tetracarboxylic acid dianhydride and 2,2-bis(3,4-dicarboxyphenyl)propane dianhydride, the molar ratio of dianhydride to diamine is from 1.5:1 to 11:10 and the blocked polyfunctional isocyanate is a reaction product of (1) a polyfunctional isocyanate selected from the cyclic trimer of 2,4-tolylene diisocyanate, triphenylmethane triisocyanate, polymeric isocyanate compounds obtained by reacting diisocyanates with polyfunctional alcohols and

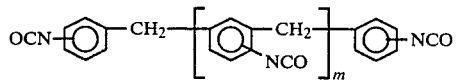

where the value of m is greater than 2 up to about 3 and (2) a monofunctional alcohol, phenol or mercaptan.

5. A method for preparing a crosslinked polyimide, said method comprising the following steps:

A. forming an anhydride-terminated polyamic acid oligomer containing an average of from 2 to 30 repeating units per molecule by reacting an aromatic diamine represented by the formula $H_2NAr^1NH_2$ where $Ar^1$ represents an divalent aromatic hydrocarbon radical that is free of $\equiv$C—O—C$\equiv$ groups, with a stoichiometric excess of an aromatic tetracarboxylic acid dianhydride represented by the general formula

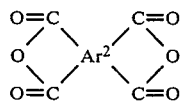

where $Ar^2$ represents a tetravalent aromatic hydrocarbon radical that is free of $\equiv$C—O—C$\equiv$ groups and the carbon atoms of each of the two anhydride groups are bonded to adjacent carbon atoms of an aromatic ring structure, B. blending said oligomer with an equimolar quantity of a blocked polyfunctional isocyanate, based on the number of moles of terminal anhydride groups present in said oligomer, where the temperature at which said blocked isocyanate reacts to form free isocyanate groups is higher than the temperature used to convert the amic acid groups of said oligomer to imide groups, C. heating the mixture of oligomer and blocked isocyanate to a temperature sufficient to convert said oligomer to a thermoplastic polyimide without reacting said blocked isocyanate, and finally D. increasing the temperature of said mixture to initiate the reaction of said blocked isocyanate with the terminal anhydride groups of said thermoplastic polyimide to form a thermoset polyimide.

6. A method according to claim 5 where said aromatic diamine is and the molar ratio of dianhydride to diamine is from 2:1 to 41:40.

7. A method according to claim 6 where the aromatic hydrocarbon radicals represented by $Ar^1$ and $Ar^2$ contain at least one carbocyclic aromatic ring structure or a plurality of said ring structures that are fused or form a series of two or more single rings that are joined directly by a carbon-to-carbon bond or through an alkylene or carbonyl group.

8. A method according to claim 7 where said aromatic diamine is selected from the group consisting of the isomeric phenylene diamines, 4,4'-diaminobenzophenone and 2,2-bis(4-aminophenyl)propane, the tetracarboxylic acid dianhydride is selected from the group consisting of 3,3',4,4'-benzophenone tetracarboxylic acid dianhydride and 2,2-bis(3,4-dicarboxyphenyl)propane dianhydride, the molar ratio of dianhydride to diamine is from 1.5:1 to 11:10 and the blocked polyfunctional isocyanate is a reaction product of (1) a polyfunctional isocyanate selected from the cyclic trimer of 2,4-tolylene diisocyanate, triphenylmethane triisocyanate, polymeric isocyanate compounds obtained by reacting diisocyanates with polyfunctional alcohols and

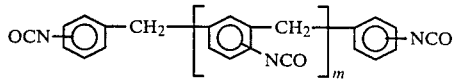

where the value of m is greater than 2 up to about 3 and (2) a monofunctinal alcohol, phenol or mercaptan.

* * * * *